July 29, 1958  J. R. RAMSON  2,845,523
CONDENSER DISCHARGE STUD WELDING MACHINE
Filed April 4, 1956  4 Sheets-Sheet 2
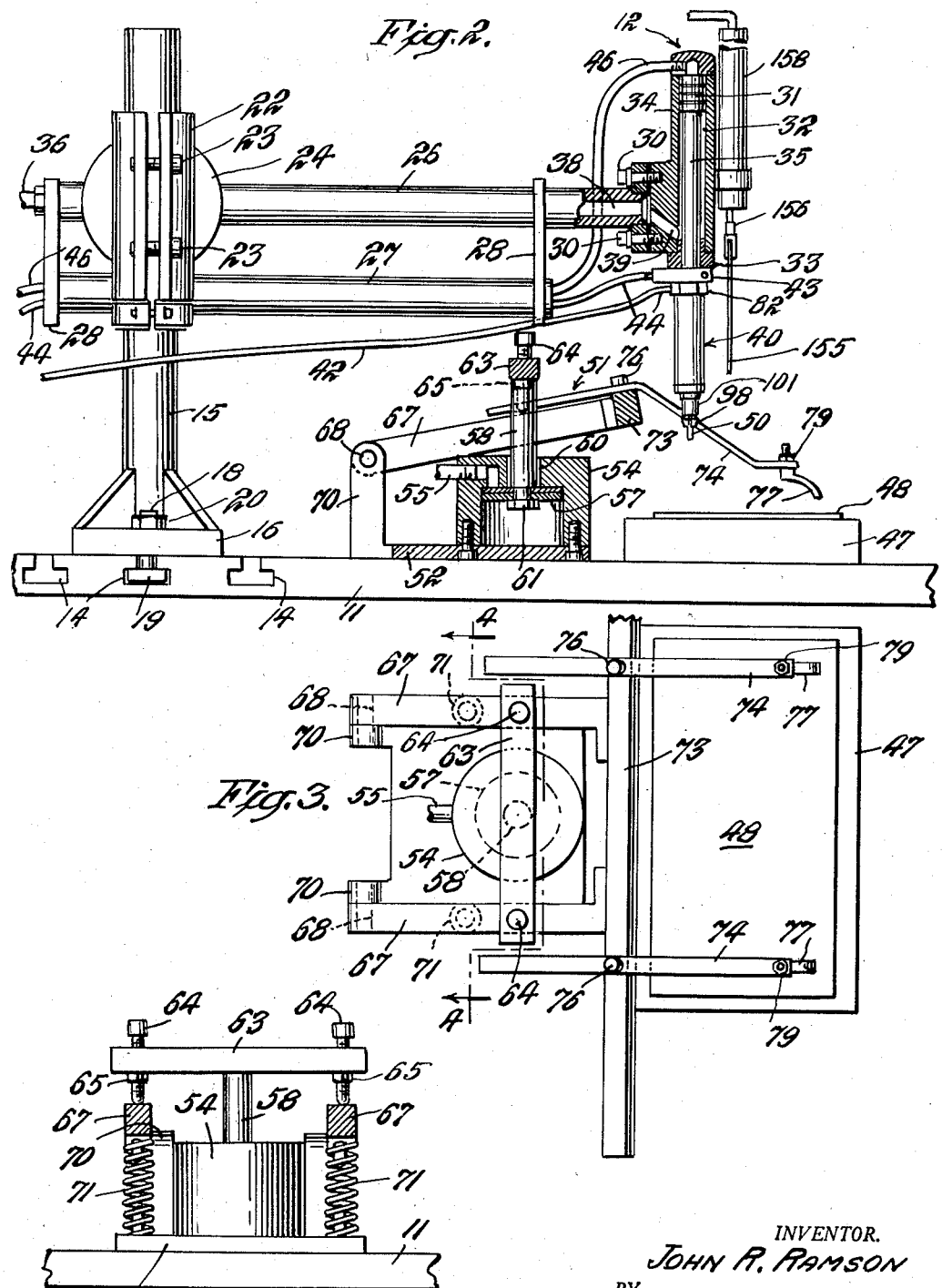
INVENTOR.
JOHN R. RAMSON
BY
*Philip S. McLean*
ATTORNEY

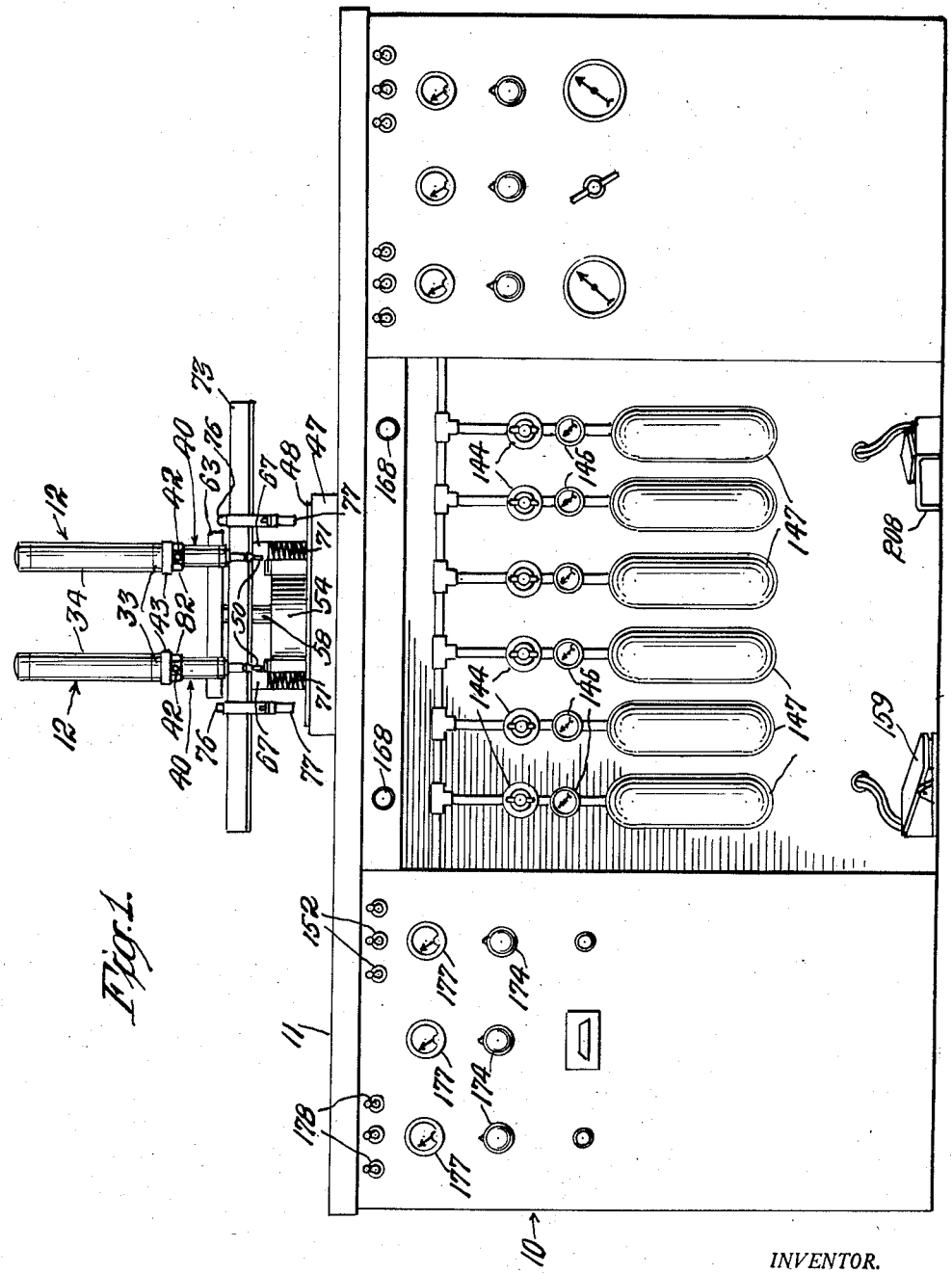

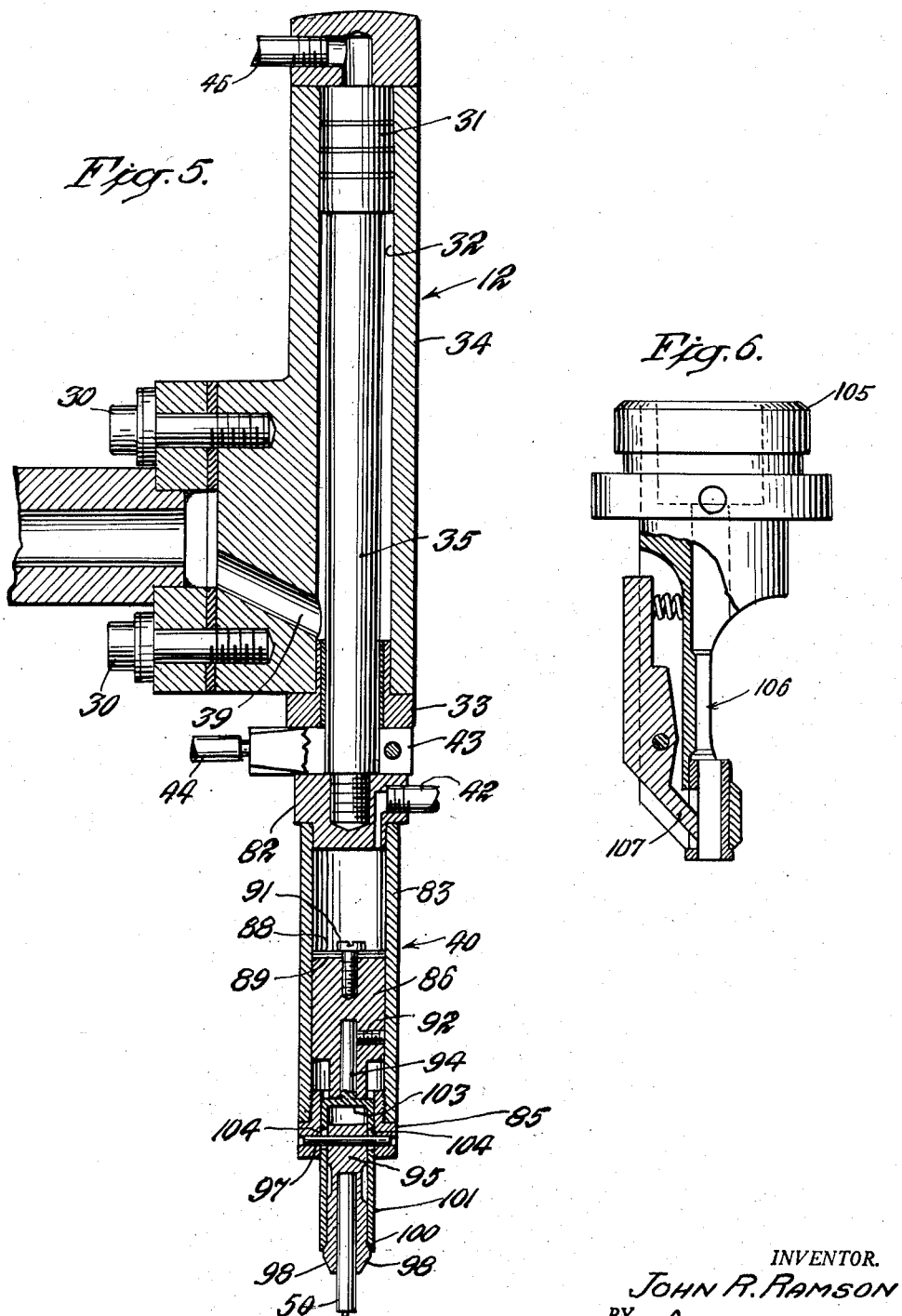

July 29, 1958

J. R. RAMSON 2,845,523

CONDENSER DISCHARGE STUD WELDING MACHINE

Filed April 4, 1956

INVENTOR.
JOHN R. RAMSON
BY
ATTORNEY

United States Patent Office

2,845,523
Patented July 29, 1958

2,845,523
CONDENSER DISCHARGE STUD WELDING MACHINE

John R. Ramson, Skokie, Ill., assignor to Croname, Incorporated, Chicago, Ill., a corporation of Illinois Application April 4, 1956, Serial No. 576,035

16 Claims. (Cl. 219—98)

The present invention relates to a condenser discharge stud welding machine comprising a plurality of guns from which a working group consisting of one or several guns may be selected, as desired, for welding a single stud or a plurality of studs in a single operation.

The machine of the present invention is of the type which welds a stud having a short small diameter integrally formed welding tip or projection to a workpiece which may be of light gauge metal. The welding energy is supplied by discharging a condenser through the welding projection as the stud is moved toward and into engagement with the workpiece by the continuous pneumatically controlled movement of a chuck in which the stud is gripped.

An object of the invention is the provision of a machine of this character comprising a group of welding guns, with means for selecting any desired number to establish a working group and control means for completely deenergizing all of the idle guns excluded from the working group both electrically and pneumatically so that the idle guns are maintained in safe and fully inoperative condition.

Another object of the invention is the provision of an air operated switch which maintains the working guns disconnected from the welding current supply except during the short time required for the actual performance of each welding operation. This is a safety precaution which minimizes the possibility of electrical shock to the operator by inadvertently touching an energized gun or discharging the capacitor associated therewith.

A further object of the invention is the provision of a timed welding cycle in which the guns descend and press the studs against the workpiece in the course of a positively timed welding cycle which is preset and uniform for each successive welding operation, independently of any variations in timing incidental to manipulation of the welding control switches by the operator.

Still another object of the invention is the provision of individual adjustment means for each gun permitting the amount of capacitor discharge welding energy delivered to each gun to be independently regulated in accordance with the requirements of the stud size and other factors connected with the specific task which is performed by each gun.

A further object of the invention includes the provision of improved stud holding chucks in which the studs are inserted from below or from above the work gripping jaws.

Various additional objects, features and advantages of the invention will become apparent from the following specification and the accompanying drawings forming a part hereof.

Referring to the drawings:

Fig. 1 is a front view in elevation of a complete stud welding machine in accordance with the invention.

Fig. 2 is an enlarged view in side elevation and partly in section, showing a single welding gun provided with a pneumatic chuck and a pneumatically operated clamp for holding the workpiece during welding.

Fig. 3 is a plan view of the clamp shown in Fig. 2.

Fig. 4 is a sectional view in front elevation taken along the line 4—4 of Fig. 3.

Fig. 5 is an enlarged sectional view in side elevation showing one of the guns and illustrating details of construction of a pneumatic chuck in which the studs are inserted from below the gripping jaws.

Fig. 6 is a further enlarged sectional detail of a chuck arranged for insertion of the studs into the top of the same.

Figure 7:
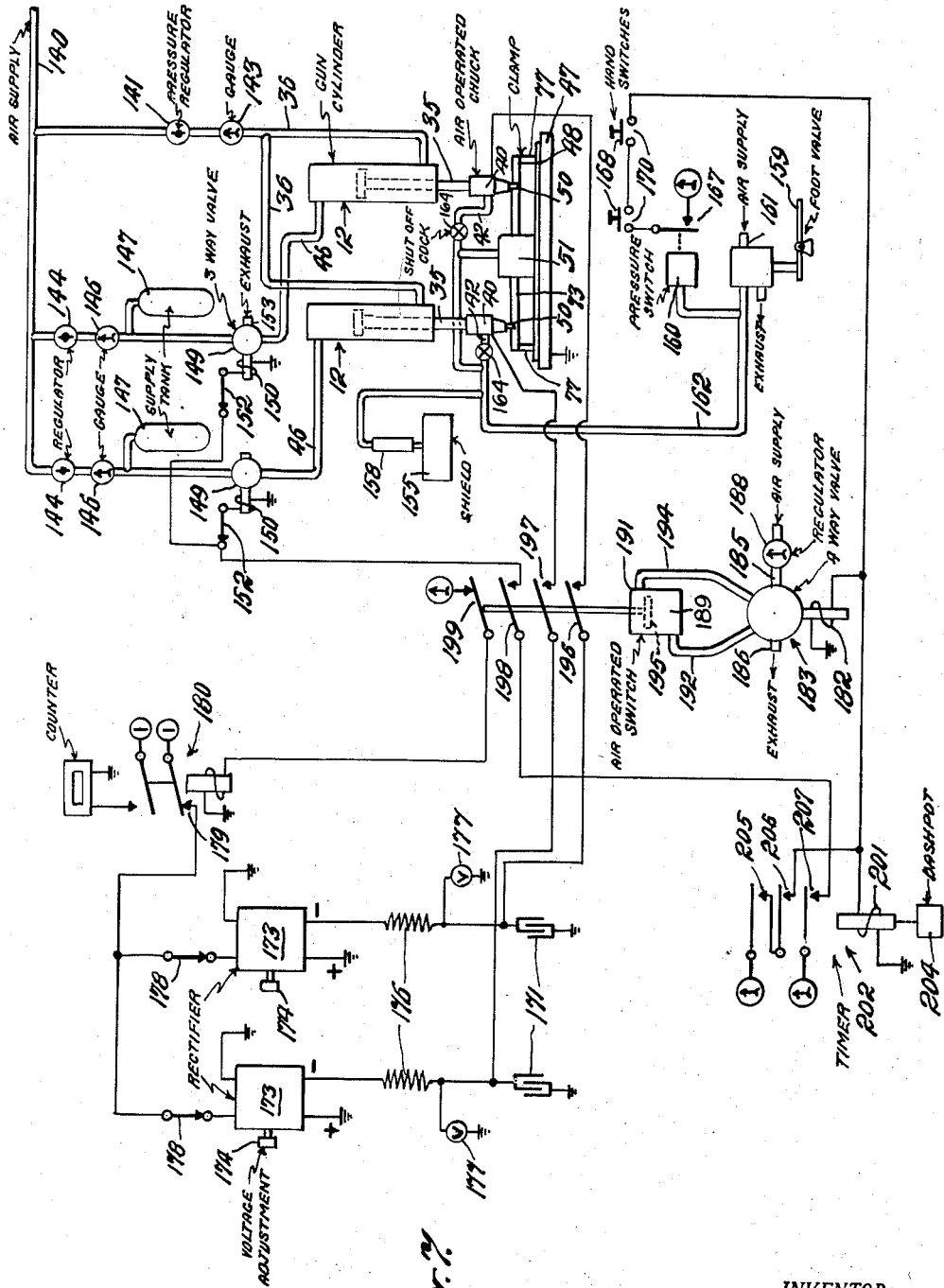
Fig. 7 is a schematic diagram of the electropneumatic circuitry of the machine in connection with only two of the six guns illustrated in Fig. 1.

Referring to Fig. 1, the machine comprises a console type cabinet 10 provided with a table top 11. Disposed on table top 11 are a plurality of welding guns each designated generally at 12. Although the machine is equipped for a total of six guns, only two of the six guns are shown in Fig. 1 and in the electropneumatic circuit drawing of Fig. 7.

The table top 11 has a series of spaced parallel inverted T-slots 14 (Fig. 2) formed in its upper surface, and each of the slots 14 extends across the full length of the table top. Each of the guns 12 is supported by an upright post 15. Each post 15 is provided with a flat-bottomed base 16 which rests on the table top. Each base 16 is made fast to the top by bolts 18 provided with heads 19 slidably received in the inverted T-slots 14. Bolts 18 are provided with nuts 20 which can be loosened for moving the base 16 to any desired position along one of the T-slots 14, after which the nuts may be tightened to hold the base 16 and post 15 firmly secured in place.

A split collar 22 is rotatably and vertically adjustably mounted on post 15 and may be clamped in any desired position by tightening screws 23. A bracket 24 is fixed to collar 22. A gun supporting arm 26 is adjustably mounted in bracket 24 and may be moved longitudinally inwardly and outwardly at will, being secured in any desired position of adjustment by suitable locking means. A hollow tubular open-ended duct 27 extends parallel to and below the gun supporting arm 26, being connected thereto by depending link members 28.

Each gun 12 is secured to the outer free end of one of the gun supporting arms 26 by means of screws 30 (Fig. 5). The gun 12 comprises a piston 31 vertically slidable in a cylindrical bore 32 formed in the body 34 of the gun. The bore 32 is closed at its lower end by a stuffing box 33. The piston 31 is connected to the upper end of a vertical piston rod 35 which passes through the stuffing box 33.

Normally, the piston 31 is held in its upward position by restoring air which is continuously supplied from a suitable source of air under pressure, as described in greater detail below. A flexible hose 36 (Fig. 2) is connected with the source and the restoring air is delivered through a longitudinal passage 38 formed in gun supporting arm 26 and through a further passage 39 formed in gun body 34 to the lower end of the cylindrical bore 32 between the piston 31 and stuffing box 33. In this manner, the piston 31 is continuously yieldingly urged upwardly to the upper limit of its travel. Air under higher pressure acting on the larger active upper surface of piston 31 is used to force the piston downwardly, as explained in greater detail below.

At its lower end, the piston rod 35 carries an air-operated chuck designated generally as 40, later to be described. Air for operation of chuck 30 is supplied through a flexible air hose 42.

A sliding contact member 43 is fixed to the gun body 34 just below the stuffing box 33 providing positive and reliable electrical contact with the piston rod 35 and chuck 40 during movement of the piston rod 35. Welding current is supplied to contact member 43 by an insulated wire 44 connected to contact member 43 and a portion of the wire 44 is enclosed in the duct 27. An air hose 46 is connected with the top of cylindrical bore 32 and passes through duct 27.

The hose 46 supplies the gun 12 with operating air to produce downward movement of chuck 40 during each welding cycle.

A block 47 fixed to the upper surface of table top 11 is shown supporting a workpiece 48. A stud 50 is shown held in chuck 40 to be welded to the workpiece 48. The block 47 is of metal and is electrically grounded along with table top 11 to complete the welding circuit.

An air-operated clamp unit designated generally as 51 is arranged to hold the workpiece 48 securely against the supporting block 47 during the welding operation. The pneumatic clamp 51 comprises a base 52 secured to table top 11. An air cylinder 54 is mounted on base 52 and is supplied with air under pressure through a line 55 communicating with the top of the cylinder. A piston 57 is vertically slidable in cylinder 54. A piston rod 58 extends through an air-tight bushing 60 in the top of cylinder 54. The lower end of piston rod 58 is connected to piston 57 by a nut 61. The upper end of piston rod 58 is connected to a cross-bar 63.

Adjustable screws 64 are disposed near the ends of cross-bar 63 and are provided with locknuts 65. The lower ends of screws 64 are rounded to bear slidably against the upper surfaces of two clamp actuating levers 67. The actuating levers 67 are pivoted by dowels 68 to upright posts 70 formed on the base 52 of clamp unit 51. The actuating levers 67 are yieldingly urged upwardly by individual compression springs 71. The outer end portions of actuating levers 67 carry an elongated clamp bar 73 (Fig. 3). Two clamping fingers 74 are mounted on clamping bar 73 by screws 76. At their outer ends, the fingers 74 are provided with downwardly curved holding tips 77 secured thereto by bolts 79.

Referring to Fig. 5, the chuck 40 comprises a head portion 82 threadedly connected to the lower end of gun piston rod 35. Connected to head 82 and extending downwardly therefrom is a hollow cylindrical body portion 83. A ring member 85 is threaded into the lower end of body 83. A piston 86 is vertically slidable within the cylindrical body 83.

An air seal is provided by washers 88 and 89 secured to the top of piston 86 by a screw 91. A set screw 92 extending laterally into piston 86 secures a cushioning member 94 therein. A collet 95 is suspended in ring member 85 by a transverse pin 97. The collet 95 is slotted longitudinally to provide a plurality of independently movable gripping jaws 98. The outer surface of the collet 95 above the jaws 98 is chamfered at 100 to produce a frusto-conical configuration which converges upwardly. The collet 95 is ensleeved within a hollow tubular slide member 101. The slide member 101 is closed at its upper end by a top wall 103.

The transverse pin 97 passes through vertically elongated apertures 104 formed in the walls of slide member 101 so that slide member 101 is capable of limited vertical movement in ring member 85 with respect to collet 95.

The lower end of slide member 101 is shaped to engage the chamfered portion 100 of collet 95 so that it will press the jaws 98 together when it moves downwardly. When air under pressure is supplied to the space above piston 86 through line 42, piston 86 presses downwardly on the top wall 103 of slide member 101 forcing slide member 101 downwardly against chamfered portion 100 and squeezing the jaws 98 of collet 95 into firm and positive engagement with the stud 50.

In this form of construction the studs are inserted from below upwardly into the chuck jaws.

Fig. 6 illustrates a form of chuck in which the studs are inserted from above into the top of the chuck.

In the latter view, the body of the chuck, designated 105, is of a form adapted to be secured to the lower end of the piston rod 35, Fig. 5, and carries a dependent guide sleeve 106 open at the top for the insertion of a stud. The stud is held in this position by a spring closed pivoted gripper jaw 107.

Referring to Fig. 7, there is shown an air supply line 140 which continuously supplies restoring air to the guns 12 through a manually adjustable pressure regulator 141. A pressure gauge 143 is provided for observation of the actual air pressure.

For each of the six guns 12, an individual manually adjustable pressure regulator 144 is provided. An individual pressure gauge 146 is provided for observation of the actual pressure of the operating air for each gun.

An individual storage tank 147 is also provided for each gun to assure an adequate supply of air at the particular pressure which is desired for the work being performed by such gun. While all six of these instrumentalities may be seen in Fig. 1, only two have been shown in Fig. 7 for simplicity of illustration. Air flow to each gun is individually controlled by a separate three-way electropneumatic valve 149 having an operating winding 150. Each winding 150 may be individually disconnected when its associated gun is not in use as a member of a working group by opening a manually operable switch 152 provided for this purpose.

Normally, the gun supply air line 46 of each gun is connected to the atmosphere through an exhaust connection 153 to each three-way valve 149. This permits the restoring air to raise the piston rod 35 of each gun without opposing air pressure. When winding 150 is energized, air under pressure is applied to the top of each piston 31 and the stud 50 is thereupon moved down into welding engagement with the workpiece 48.

As a safety precaution, a transparent shield 155 is lowered so that it is interposed between the workpiece 48 and the operator during the welding operation. The shield 155 is supported at the lower end of the upwardly spring-pressed piston rod 156 of an air cylinder 158.

A foot valve 159 is provided for actuation by the operator prior to the start of the welding cycle. Actuation of foot valve 159 causes air to flow from a supply line 161 to an air line 162. Line 162 extends to the shield lowering air cylinder 158 bringing the shield 155 down into its protective position. The foot valve 159 also admits air under pressure from line 162 to the chuck control air hoses 42 for causing the chucks 40 to grip their respective studs 50. Individual shut-off cocks 164 are interposed between the air line 162 and each of the individual chuck control hoses 42 for shutting off the air when a particular gun is not in use.

Operation of foot valve 159 also causes operation of an air pressure actuated electric switch 160 which thereupon closes its normally open contacts 167. At this time, the machine is in readiness for the start of the welding cycle. The operator next uses both hands to press two spring-urged, self-restoring manually operable hand switches 168.

The hand switches 168 are provided with normally open contacts 170 connected in series with each other and with air pressure switch contacts 167. This action assures that both hands of the operator are removed from proximity to the guns during the welding operation, the switches 168 being located at the front of the machine below the table top 11 (Fig. 1).

A capacitor 171 for each gun is normally maintained in a charged condition and serves as a source of welding current. For this purpose, a rectifier 173 of adjustable output voltage is associated with each capacitor 171. Each rectifier is provided with an individual manually adjustable output voltage control 174. For protection of each rectifier 171 from peak overloads, the maximum charging current which can be delivered to each capacitor 171 is limited by a series resistor 176 serially included in the charging circuit from the rectifier 173 to its associated capacitor 171. The actual voltage at which each capacitor is maintained charged may be observed by means of an individual voltmeter 177 connected across the capacitor.

Each rectifier is provided with a manually operable control switch 178 which is opened when the gun with which a particular rectifier is associated is not in use. In this manner, the capacitor associated with an idle gun remains in a discharged condition. Except during the welding cycle, all of the rectifiers are supplied with alternating current from the ungrounded side of a commercial alternating current supply circuit indicated by the symbol for ground.

The other side of the supply circuit is indicated by the symbol ± for "plus-or-minus." A master control switch (not shown) may be interposed in the supply line.

If the rectifiers 173 should comprise tubes having cathodes which require a heating interval before operation, the contacts of a time delay relay (not shown) may also be interposed in the alternating current supply circuit in the usual manner.

Additionally, as a safety precaution for the operator, an insulating transformer may be interposed in the supply circuit and all ground connections shown will then be made independently of the supply circuit and connected to a reliable and independent ground circuit so that the grounding of the machine cannot be affected by conditions in the power supply circuit.

The power supply circuit for rectifiers 173 extends through the closed contacts 179 of a normally energized charging relay 180 which shuts off the charging current during the welding cycle.

Simultaneous closure of the hand switch contacts 170 together with air switch contacts 167 establishes a circuit which energizes the operating winding 182 of an electropneumatic 4-way valve designated generally as 183. Valve 183 comprises inlet and exhaust connections 185 and 186, respectively. Air under pressure is supplied from the main air supply source and through a manually adjustable pressure regulator 188 to the inlet connection 185 of 4-way valve 183. The actuating cylinder 189 of a multi-pole air-operated switch 191 is connected to the 4-way valve 183 by air lines 192 and 194.

With operating winding 182 of valve 183 deenergized, air under pressure is supplied through air line 192 to the lower end of cylinder 189 and the upper end of cylinder 189 communicates with the exhaust connection 186 through air line 194, thus forcing piston 195 upwardly. This maintains the contacts of the switch 191 in the positions indicated in the drawings.

These contacts comprise six very heavy duty normally open poles 197 of which only two are illustrated and which handle the welding current, and two auxiliary light duty poles 198 and 199 of which pole 198 is normally open and pole 199 is normally closed.

When the operating winding 182 of valve 183 is energized, the inlet and exhaust connections to air lines 192 and 194 are interchanged so that air under pressure is supplied to the top of actuating cylinder 189 while the bottom of actuating cylinder 189 is connected with the exhaust, thus forcing piston 195 down and operating the switch contacts. The charged capacitors 171 are thus connected through poles 197 to their respective guns 12. Auxiliary pole 198 closes, thereby preparing a common energizing circuit for the operating windings 150 of the three-way valves 149 which, in turn, control the vertical movements of the stud-bearing chucks 40.

At the same time that the operating winding 182 of 4-way valve 183 is energized, the operating winding 201 of a dashpot timer 202 is energized. The timer 202 comprises a dashpot 204 which controls the operation of the timer and of the welding cycle of the machine. Immediately upon energization of timer operating winding 201, serially connected contacts 205 and 206 both close simultaneously, thereby establishing a holding circuit for timer 202 and establishing an energizing circuit for the 4-way valve operating winding 182 which is independent of the hand switches 168.

The welding cycle then proceeds under the control of timer 202 even though the operator releases the hand switches 168 immediately after they have been pressed. The timer proceeds through a time cycle after which contacts 206 open and interrupt the holding circuit. Thereupon, timer winding 201 and valve operating winding 182 are both deenergized and the circuit restored to a condition of readiness for the next welding cycle.

During an independently adjustable time interval commencing after the closure of contacts 205 and 206, and terminating before the opening of contacts 206, a separate pair of gun control contacts 207 closes and reopens. During the interval of closure of gun control contacts 207, the windings 150 of all active gun control valves 149 are energized and all of the stud-bearing chucks 40 associated with their respective guns descend simultaneously, each discharging its associated capacitor through the respective stud, thus welding each stud to the workpiece 48.

The period of closure of gun control contacts 207 is made sufficiently long to assure proper welding of every stud. The chucks 40 remain down until the operator removes his foot from foot valve 159. The air switch 183 opens the discharge circuits to the guns at the expiration of the time interval for opening contacts 206.

Another foot operated air valve 208 is shown in Fig. 1 and advantageously may be arranged as desired to supply air to the welding fixture for cleaning purposes or the like.

For some operations it is more convenient or practical to insert the studs into the chucks from the bottom, in which case, chucks of the type shown in Fig. 5 are employed.

In other instances, it may be best or easiest to insert the studs from the side and drop them into the top of the chucks, in which case, top feed chucks of the type shown in Fig. 6 are employed.

What is claimed is:

1. Stud welding apparatus of the class described, comprising in combination a plurality of welding guns each including individual chuck means for holding a stud to be welded and pneumatic means for causing movement of said chuck means to bring said stud into welding engagement with a workpiece, an individual capacitor connected to each gun for supplying welding current to said stud by discharge of said capacitor through said stud in the course of said welding engagement, current supply means for charging each capacitor, electropneumatic valve means for controlling operation of said pneumatic means and electrically controlled timing means connected to control operation of all of said valve means for determining the duration of said welding engagement and circuit means controlled along with said timing means and connected to said current supply means for suspending charging of each capacitor during said welding engagement.

2. In stud welding apparatus of the class described, in combination a plurality of welding guns, each of said guns comprising chuck means for holding a stud to be welded, pneumatic means for causing movement of said chuck means to bring said stud into welding engagement with a workpiece, and means normally urging said chuck means away from said workpiece, electropneumatic valve means for controlling the supply of air to said pneumatic means, opening of said valve means causing movement of said chuck means toward said workpiece, capacitor means associated with said guns for supplying welding current to each stud by discharge of said capacitor means therethrough, switch means for connecting said capacitor means to said guns, said switch means normally maintaining said capacitor means disconnected and control means for initiating each operation of said apparatus by opening said valve means, said control means including circuit means for causing operation of said switch means to connect said capacitor means to said guns no later than the opening of said valve means and for causing further operation of said switch means to maintain said capacitor means disconnected during closure of said valve means.

3. Apparatus according to claim 2, wherein said switch means comprises an air-operated switch and a switch control air valve for controlling operation of said air-operated switch, said control means comprising timing means operated with said switch control air valve for delaying the opening of said first-named electropneumatic valve means until after operation of said air-operated switch to connect said capacitor means to said guns.

4. Apparatus according to claim 2, in which said capacitor means comprises a separate capacitor individual to each of said guns, said switch means including a plurality of separate poles for individually connecting each of said capacitors to one of said guns.

5. Apparatus according to claim 4, further comprising individual current supply means for charging each of said capacitors, each of said current supply means including individual voltage adjustment means for determining the maximum voltage to which its associated capacitor is to be charged.

6. Apparatus according to claim 2, further comprising an air-operated clamp for holding said workpiece during said welding engagement and in which said control means comprises further valve means for controlling said clamp and a pressure switch controlled by said further valve means, said control means being inoperative to open said first-named electropneumatic valve means until after closure of said pressure switch by said further valve means.

7. Apparatus according to claim 6, further comprising an air-operated transparent shield movable to be interposed between said workpiece and an operator of said apparatus, said shield being controlled by said further valve means.

8. Apparatus according to claim 6 in which said further valve means is a foot-operated valve and wherein said control means comprises two manually operated switches connected in series with each other and with said pressure switch, said manually operated switches being positioned to require that both hands of an operator of said machine shall be safely positioned away from said guns, simultaneous closure of both of said switches being required to cause said welding engagement.

9. Apparatus according to claim 2, further comprising shut-off means individual to each gun for selectively rendering each of said guns both electrically and pneumatically completely deenergized.

10. Apparatus according to claim 9 and comprising supporting means upon which said guns are adjustably mounted for permitting a selected combination of said guns to be arranged to form a working group, all of said guns excluded from said working group being deenergized by said shut-off means.

11. Apparatus according to claim 3 in which said chuck means comprises in combination an air cylinder, a piston slidable in said cylinder, means for admitting air under pressure to said cylinder at one side of said piston, a collet disposed at the end of said cylinder which is at the other side of said piston, said collet comprising gripping jaw members for receiving and gripping a stud, said jaw members having sloping surfaces directed toward said piston, a hollow cylindrical slide member slidably ensleeving said collet, one end of said slide member being engageable with said sloping surfaces for causing closure of said jaw members to grip said stud, the other end of said slide member being engageable by said piston to force closure of said jaw members and supporting means extending through the cylindrical wall of said slide member, said supporting means connecting said collet to said cylinder for preventing relative axial movement therebetween, said slide member having at least one axially elongated aperture formed in said wall, said aperture axially slidably receiving said supporting means.

12. The invention according to claim 11, in which said supporting means consists of a transversely extending pin passing diametrically through an end portion of said collet remote from said jaw members.

13. The invention according to claim 11, wherein said collet is of one-piece construction and is formed of springy material, workpiece gripping end portions thereof having axially extending slots formed therein defining said jaw members.

14. A chuck according to claim 11 having an electrical supply conductor connected to said piston.

15. The invention according to claim 3 in which said chuck means comprises an air cylinder, a piston operating therein, a projecting piston rod carried by said piston, a chuck body carried by said piston rod, said chuck body being open at one side and having a stud guiding sleeve open at the top to said open side of the chuck body for enabling the stud to be entered in the open side of the chuck body and dropped down into said guide sleeve and a clamp jaw for holding a stud so entered in said guide sleeve.

16. The invention according to claim 15 with an electrical supply conductor secured on the projecting portion of said piston rod.

References Cited in the file of this patent

UNITED STATES PATENTS

| Number | Name | Date |
|---|---|---|
| 633,852 | Kendrick | Sept. 26, 1899 |
| 949,439 | Rhyne | Feb. 15, 1910 |
| 2,057,670 | Crecca et al. | Oct. 20, 1936 |
| 2,173,368 | Martin | Sept. 19, 1939 |
| 2,479,076 | Martin | Aug. 16, 1949 |
| 2,610,278 | Graham | Sept. 9, 1952 |
| 2,682,414 | Richardson | June 29, 1954 |